Feb. 5, 1952 R. C. MONTANUS 2,584,360
INDICATING AND SETTING MECHANISM FOR MACHINE TOOLS
Filed Jan. 25, 1949
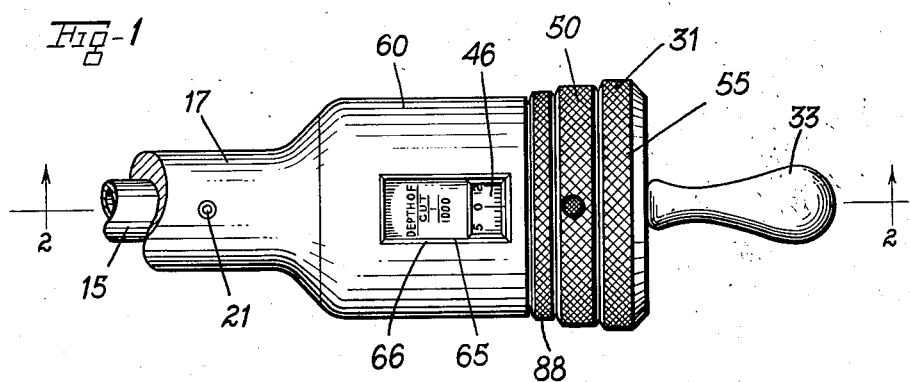
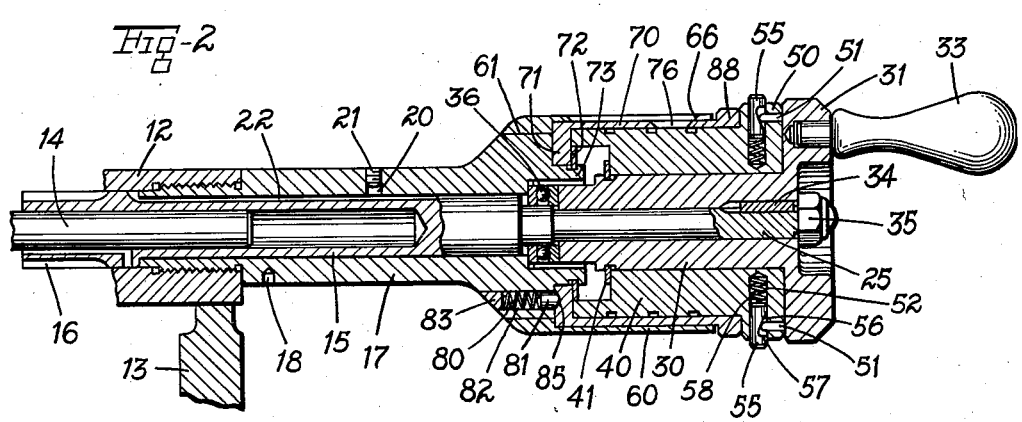
INVENTOR.
Richard C. Montanus
BY
Marechal & Biebel
ATTORNEYS Patented Feb. 5, 1952

2,584,360

UNITED STATES PATENT OFFICE 2,584,360

INDICATING AND SETTING MECHANISM
FOR MACHINE TOOLS

Richard C. Montanus, Dayton, Ohio, assignor to
The Springfield Machine Tool Co., Springfield,
Ohio, a corporation of Ohio Application January 25, 1949, Serial No. 72,663

8 Claims. (Cl. 116—115.5)

1

This invention relates to indicating mechanism for a machine tool.

One of the principal objects of the invention is to provide an indicating mechanism for a machine tool which includes a plurality of different scales calibrated in accordance with different working dimensions to be measured in performing work operations with the tool and which also includes a selective indexing member for positively assuring that the operator will read only the proper scale corresponding to the particular dimension of the workpiece involved in the particular work operation.

Another object is to provide indicating mechanism for controlling working movements of a shaft on a machine tool which is quickly and easily reset to zero or any other desired index position without the use of tools by releasing a spring catch on a cylindrical scale member and rotating the scale member to the desired index position.

It is also an object of the invention to provide such indicating mechanism for a machine tool which is of simple construction, embodying relatively few working parts for economical manufacture, and which can be readily incorporated in an existing machine tool for use in controlling working operations of the tool.

Other objects and advantages of the invention will be apparent from the following description, the accompanying drawing, and the appended claims.

In the drawing:

Fig. 1 is a plan view of indicating mechanism constructed in accordance with the invention for the cross feed screw of a lathe;

Fig. 2 is a vertical section on the line 2—2 of Fig. 1;

Fig. 3 is a detail view in elevation of the sleeve which carries the plurality of scales;

Fig. 4 is a similar view of the selector sleeve for registering a selected single scale with the viewing aperture in the outer sleeve; and Fig. 5 is a fragmentary view in perspective showing the indicating mechanism mounted on a lathe.

The drawing, which illustrates a preferred embodiment of the present invention, shows indicating and setting mechanism applied, by way of example, to the cross slide or compound rest 10 of a lathe indicated at 11 in Fig. 5 and having a carriage 12 and apron 13. The mechanism includes separate scales for measuring the depth of cut, and either the inside diameter or the outside diameter to which a cut is made, and it also includes an index member for concealing any selected pair of the scales to leave visible only the proper scale for the particular operation being performed on the lathe.

Referring particularly to Fig. 2, the outer end of the cross feed screw 14 is keyed within the hollow hub portion 15 of the cross feed pinion 16, and the hub 15 is in turn journaled within the cross feed bush 17 threaded into the front of the lathe carriage 12. A hole 18 in the side of bush 17 is adapted to receive a suitable wrench for tightening the bush in the lathe carriage. A lubrication hole 20 is also provided in the bush and is closed by means of a threaded plug 21, the hub 15 having a longitudinal groove 22 therein providing a lubricant reservoir.

The hub 15 includes a shaft portion 25 which extends beyond the outer end of bush 17, and on this shaft is mounted the cylindrical hub portion 30 of the cross feed hand wheel 31 provided with the usual crank handle 33. The shaft 25 and hub 30 are secured together by means of a key 34 and a nut 35 threaded on the outer end of the shaft, and a suitable thrust bearing 36 is provided between the inner end of hub 30 and the outer end of bush 17. Rotation of the hand wheel 31 by means of crank handle 33 will accordingly produce rotation of the cross feed screw 14 to effect corresponding movement of the cross slide 10 of the lathe in the usual way.

A cylindrical sleeve 40 is rotatably mounted on the hub 30 of the hand wheel and is held axially thereon by a snap ring 41 engaging in a peripheral groove adjacent the inner end of the hub. Three scales 44, 45 and 46 are arranged circumferentially on the surface of sleeve 40 in axially spaced relation, grooves 47 being provided between the scales as shown in Fig. 3. These three scales are calibrated respectively to measure the outside diameter of a workpiece, the inside diameter of a workpiece, and the depth of cut, and their zero positions coincide to facilitate resetting.

Means are provided for releasably locking the scale-bearing sleeve 40 to hand wheel 31 for rotation with hub 30. The outer end of sleeve 40 is formed with a radially extending flange portion 50 which is knurled to provide a convenient handle. The outer end of sleeve 40, including the flange portion 50, is in face to face relation with the inner end of the hand wheel 31, and two locking pins 51 are mounted in flange 50 for sliding movement parallel to the axis of shaft 25, the inner ends of pins 51 extending into radial bores 52 in flange 50. In each of bores 52 there is mounted a pin 55 having a portion along the side thereof cut away at an angle to form a camming surface 56 terminating in a shoulder 57 at its outer end. A compression spring 58 is mounted in each bore 52 between the inner end of the bore and the inner end of the cam pin 55 therein.

The springs 58 normaly urge the cam pins 55 radially outwardly of the sleeve 40, and the camming surfaces 56 thus act to urge lock pins 51 axially to the right as viewed in Fig. 2, and into frictionally locking engagement with the adjacent face of the hand wheel 31. However, when the cam pins 55 are manually pressed inwardly against springs 58, the pressure will be removed from the lock pins 51, thus releasing the locked connection between sleeve 40 and hand wheel 31 and permitting rotation of the sleeve on the hub 30. It will also be noted that when the parts are assembled as shown in Fig. 2, the inner ends of pins 51 interlock with the camming surfaces 56 and shoulder 57 to limit movement of cam pins 55 in each direction and also to hold the cam pins in place.

An outer sleeve 60 is mounted in stationary relation with the bush 17, sleeve 60 being press-fitted on bush 17 at 61 and extending outwardly therefrom in concentric relation with sleeve 40 and hub 30. The sleeve 60 is of sufficient length to form a shield axially overlying all three of the scales on sleeve 40, and a viewing aperture or window 65 having a beveled rim 66 is cut in the upper surface of sleeve 60 of sufficient dimensions to permit simultaneous viewing of portions of each of the scales 44 to 46. As shown, the sleeve 60 is normally mounted in stationary relation with the lathe and with the window 65 therein uppermost for convenient reading of the scales therethrough.

An intermediate or selector sleeve 70 is rotatably mounted within the outer sleeve 60. As shown in Fig. 2, the inner end of sleeve 70 is extended inwardly to form an annular shoulder 71 overlapping the inner end of sleeve 40, and the shoulder 71 is held axially in position by means of a snap ring 72 received in a circumferential groove on the extending end portion 73 of bush 17. The sleeve 70 is formed with three viewing apertures or windows 74, 75 and 76 smaller than window 65, each of these windows 74—76 being of sufficient dimensions to expose only a single one of scales 44—46. The windows 74, 75 and 76 are arranged in the proper axial relation to overlie the scales 44, 45 and 46 respectively, and each is provided with a suitable legend such as "Outside diam.," "Inside diam.," and "Depth of cut." In addition, these windows are spaced angularly about the surface of sleeve 70 in such manner that when one thereof is in registry with window 65 in sleeve 60 both of the other apertures will be wholly concealed by sleeve 60, and the portions of sleeve 70 adjacent the registered window therein will act as a shield to cover and conceal the other two scales on sleeve 40. The rims of these windows are beveled, as indicated at 77, to facilitate reading and indexing the scales against the side edges of the windows, and separate index marks may be provided on sleeve 70 adjacent each of these apertures if desired.

In order to provide for conveniently indexing and releasably securing the selector sleeve 70 with respect to the outer sleeve 60, a detent mechanism comprising a spring 80 and a lock pin 81 having a rounded outer end is mounted in a bore 82 in the outer end face of bush 17, the inner end of this bore being closed by a plug 83. The end face of the flange portion 71 of sleeve 70 is formed with three recesses 85 for the respective windows 74—76, and they may be conveniently arranged on diameters with the centers of the windows, in which case the sleeve 60 should be mounted with the center of its window 65 directly opposite the detent pin 81. Thus the selector sleeve 70 can be rotated with respect to outer sleeve 60 to any of three indexed positions in which one of the windows therein will be in accurate registry with the window 65, Figs. 1 and 2 showing these parts with the window 76 thus in registry to expose only the scale 46 for measuring the depth of cut. In order to facilitate adjusting movement of sleeve 70, it is provided with a flange portion 88 extending radially outwardly between the outer end of sleeve 60 and the flange 50 on sleeve 40 and knurled to provide a convenient handle.

In operation, the selector sleeve 70 is first indexed with respect to sleeve 60 to place the desired window 74, 75 or 76 in registry with the window 65 in accordance with the particular work operation to be performed or dimension of the workpiece to be measured, this indexing being readily acomplished by grasping the knurled portion 88 and rotating the selector sleeve until the proper recess 85 is in position to receive the detent pin 81. The scale-bearing sleeve 40 is then reset to zero or any desired other reference position by pressing the cam pins 55 inwardly to release locking pins 51 and then rotating sleeve 40 to the desired position, and it will be apparent that the resetting operation is the same whichever scale is in use.

It will be noted that the arrangement of the cam pins 55 in the flange 50 of sleeve 40 is such that the normal grip of the operator on the flange 50 for resetting sleeve 40 will result in pressing the cam pins to their release position, thus facilitating quick and easy adjustment. Further indexing and resetting of the sleeves may be carried out with equal facility as desired while the work operation progresses, and all such adjusting may be done without loosening nuts or bolts or otherwise requiring the use of tools. In addition, since the shielding action of the selector sleeve 70 permits the operator to see only the single preselected scale for the work operation to be performed, the invention provides for accelerating reading of the scale as well as preventing possible error resulting from inadvertent reading of the wrong scale.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Mechanism for setting a movable work member of a machine tool to selectively indicate the movement thereof in operation comprising control means for fixing the position of said working member, an indicator having a plurality of series of markings thereon correlated in accordance with different working operations of said working member, means for releasably presetting said indicator in relation to said control means to establish a predetermined relation between the position of said working member and said markings, means for operatively connecting said indicator with said working member to cause indicating movement of said markings in accordance with the working movement of said working member, and means for selectively concealing certain of said series of markings leaving visible only a selected said series in accordance with the particular work operation.

2. Apparatus of the character described for controlling and measuring the working operations of a shaft of a machine tool comprising a scale member, an index member cooperating with said scale member, means mounting said scale and index members for relative rotation, means for holding one of said scale and index members against rotation, means for effecting a connection of the other of said scale and index members to said shaft for rotation in response to rotation of said shaft causing relative movement of said scale and index members measuring the extent of rotation of said shaft, yieldable means normally urging said connecting means to a position effecting said connection, and means mounting said connecting means for movement against said yieldable means to a release position providing for movement of said other of said scale and index members with respect to said shaft for relative resetting of said scale and index members.

3. Apparatus of the character described for controlling working operations of a shaft of a machine tool comprising a rotatable control member for operating said shaft, a sleeve mounted for coaxial rotation with respect to said control member, said control member having a portion in face-to-face relation with one end of said sleeve, a cooperating member mounted for rotation with respect to said sleeve, cooperating scale and index means carried one by said sleeve and the other by said cooperating member, a locking member mounted for movement in said end portion of said sleeve and projecting therefrom for locking engagement with said control member, a cam mounted in said sleeve for movement transversely of said locking member and including a camming portion adapted to urge said locking member into locking engagement with said control member, and a spring arranged to urge said cam in a direction to effect locking movement of said locking member, said cam being movable against said spring to effect release of said locking member.

4. Apparatus of the character described for controlling working operations of a shaft of a machine tool comprising a rotatable control member for operating said shaft, a sleeve mounted for coaxial rotation with respect to said control member, said control member having a portion in face-to-face relation with one end of said sleeve, a cooperating member mounted for rotation with respect to said sleeve, cooperating scale and index means carried one by said sleeve and the other by said cooperating member, a locking pin mounted for movement in said sleeve generally parallel with the axis of rotation thereof and projecting from said end portion of said sleeve in the direction of said control member, a cam mounted for in and out movement in said sleeve with respect to said axis of rotation thereof, said cam including a camming portion adapted to engage the inner end of said pin to urge said pin into locking relation with said control member upon outward movement of said cam, and a spring positioned to urge said cam normally outwardly of said sleeve, said pin and said camming portion of said cam being arranged to interlock and to limit movement of said cam in both directions with respect to said sleeve.

5. Apparatus of the character described for controlling working operations of the cross feed screw of a lathe comprising a rotatable hand wheel for operating said screw, a sleeve mounted coaxially with said hand wheel and in end-to-end relation therewith, a scale arranged circumferentially on said sleeve, an index member cooperating with said scale, a pin slidably mounted in the end of said sleeve and projecting therefrom for locking engagement with said hand wheel, a second pin slidably mounted in the side of said sleeve generally transversely of said locking pin, said second pin having a tapered portion abutting the inner end of said locking pin and forming a cam for urging said locking pin into locking engagement with said hand wheel, said cam pin being arranged to effect said locking movement of said locking pin upon movement thereof outwardly of said sleeve, and a spring mounted within said sleeve for urging said cam pin normally outwardly, said cam pin being movable inwardly of said sleeve against said spring to provide for release of said locking pin and relative resetting of said scale and said index member.

6. Apparatus of the character described for controlling and measuring the working operations of a shaft of a machine tool comprising a sleeve rotatably mounted on said shaft, a plurality of different scales arranged circumferentially on said sleeve in axially spaced relation and calibrated in accordance with different working movements of said shaft to be measured, a stationary shield on said tool overlying said sleeve and having a viewing aperture therethrough of sufficient size to permit simultaneous viewing of portions of all of said scales, a movable shield mounted intermediate said stationary shield and said sleeve for angular movement with respect to both thereof, said movable shield having a plurality of viewing apertures therein corresponding with said plurality of scales and angularly spaced thereon to provide for registering only a selected one thereof and the corresponding said scale with said viewing aperture in said stationary shield, means for selectively indexing said shields together with a selected one of said viewing apertures in said movable shield in registry with said viewing aperture in said stationary shield, means for securing said sleeve to said shaft for rotation therewith to cause indicating movement of said corresponding scale with respect to said registered viewing apertures, and means for releasing said securing means to provide for resetting of said scales with respect to said viewing apertures in said movable shield.

7. Apparatus of the character described for controlling and measuring the working operations of a shaft of a machine tool comprising three sleeves mounted in concentric relation with said shaft, the innermost of said sleeves having a plurality of different scales arranged circumferentially thereon in axially spaced relation and calibrated in accordance with different working movements of said shaft to be measured, the outermost of said sleeves having a viewing aperture therethrough of sufficient size to permit simultaneous viewing of portions of all of said scales, the intermediate one of said scales having a plurality of viewing apertures therein corresponding with said plurality of scales and angularly spaced thereon to provide for registering only a selected one thereof with said viewing aperture in said outermost sleeve, means for selectively indexing said outermost and said intermediate sleeves together with a selected one of said viewing apertures in said intermediate sleeve in registry with said viewing apertures in said outermost sleeve to expose a portion of the corresponding said scale while concealing all of the other said scales, said intermediate sleeve including a portion extending radially outwardly beyond the outer end of said outermost sleeve to provide a handle for rotation thereof with respect to said outermost sleeve to change the indexed relation of said intermediate and outermost sleeves, and means for releasably securing said innermost sleeve to said shaft for rotation therewith to cause indicating movement of said corresponding scale with respect to said registered viewing apertures, said innermost sleeve including a portion extending radially outwardly beyond the outer end of said outwardly extending portion of said intermediate sleeve to provide a handle for rotation of said innermost sleeve with respect to said shaft and said intermediate sleeve for resetting said scales.

8. Apparatus of the character described for controlling and measuring the working operations of a shaft of a machine tool comprising three sleeves mounted in concentric relation on said shaft, the innermost of said sleeves having a plurality of different scales arranged circumferentially thereon in axially spaced relation and calibrated in accordance with different working movements of said shaft to be measured, the outermost of said sleeves having a viewing aperture therethrough of sufficient size to permit simultaneous viewing of portions of all of said scales, the intermediate one of said scales having a plurality of viewing apertures therein corresponding with said plurality of scales and angularly spaced thereon to provide for registering only a selected one thereof with said viewing aperture in said outermost sleeve, means for selectively indexing said outermost and said intermediate sleeves together with a selected one of said viewing apertures in said intermediate sleeve in registry with said viewing aperture in said outermost sleeve to expose a portion of the corresponding said scale while concealing all of the other said scales, said innermost sleeve including a portion extending radially outwardly beyond the adjacent end of said intermediate sleeve to provide a handle for effecting rotation of said innermost sleeve with respect to said shaft and said intermediate sleeve, means for releasably locking said innermost sleeve to said shaft, said locking means including a member projecting outwardly of said handle portion of said innermost sleeve, and means normally urging said projecting member outwardly to effect locking of said innermost sleeve to said shaft for rotation with said shaft to cause rotation of said cylindrical member with respect to said inner shield for indicating movement of said corresponding scale with respect to said registered viewing apertures, said urging means being resiliently compressible to provide for inward movement of said projecting member to a release position upon gripping of said handle portion by the operator of said machine tool.

RICHARD C. MONTANUS.

REFERENCES CITED

The following references are of record in the file of this patent:

UNITED STATES PATENTS

| Number | Name | Date |
|---|---|---|
| 1,127,525 | Runge | Feb. 9, 1915 |
| 1,235,437 | Chard | July 31, 1917 |
| 1,508,794 | Ingham | Sept. 16, 1924 |
| 1,514,617 | Horridge | Nov. 11, 1924 |
| 2,069,921 | Murray | Feb. 9, 1937 |
| 2,336,163 | Bullard et al. | Dec. 7, 1943 |
| 2,404,831 | Durrett | July 30, 1946 |